Patented May 17, 1938

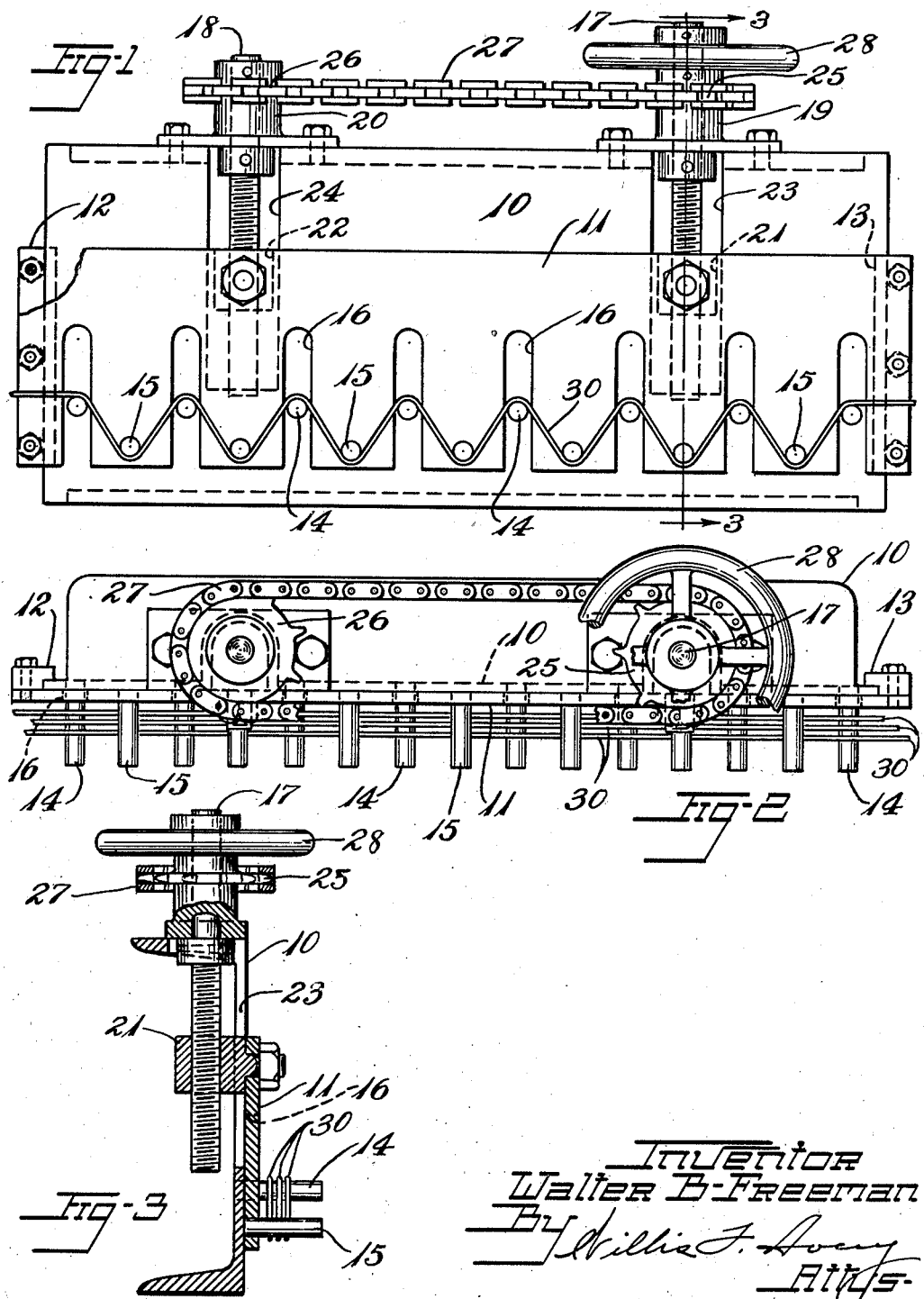

2,117,412

UNITED STATES PATENT OFFICE 2,117,412

TENSION DEVICE

Walter B. Freeman, Cuyahoga Falls, Ohio, assignor to The B. F. Goodrich Company, New York, N. Y., a corporation of New York Application November 10, 1936, Serial No. 110,067

1 Claim. (Cl. 242—153)

This invention relates to tension devices such as are used for applying tension to strip material.

The principal objects of the invention are to provide simplicity of structure, a high range of adjustability, and accuracy of adjustment.

Other objects will appear from the following description and the accompanying drawing.

Of the drawing:

Fig. 1 is a side elevation of the device in its preferred form.

Fig. 2 is a plan view of the same.

Fig. 3 is a sectional view taken on line 3—3 of Fig. 1.

Referring to the drawing, the numeral 10 designates a stationary frame member. A moveable plate 11 is slidably mounted upon the face of the frame member and is provided with gibs 12, 13 for guiding it in its sliding movement. Frame 10 is provided with a plurality of spaced strip engaging members 14, preferably in the form of stationary pins. Plate 11 is provided with similar strip engaging members 15 arranged in intercalated relation to members 14, and plate 11 is formed with clearance slots 16 to clear the members 14 during its movement.

In order to provide for adjusting plate 11 along frame 10, a plurality of feed screws 17, 18 are rotatably mounted in bearings 19, 20, fixed to the frame 10 and with their axes parallel and corresponding to the desired path of movement. Threaded nuts 21, 22 are fixed to the plate 11 and extend through clearance slots 23, 24 formed in the frame 10 so as to engage the feed screws.

To provide for simultaneous movement of the feed screws, a pair of sprockets 25, 26, are fixed thereto and connected by a chain 27. A hand wheel 28, fixed to one of the feed screws permits hand adjustment.

In the drawing, a plurality of strips, or cords, 30 are shown as being simultaneously tensioned by being led in a sinuous path about the tensioning pins 14, 15. By adjustment of the pins so as to raise pins 15 above the plane of pins 14, the strips may be threaded through the device without tension. As the pins 15 are lowered, the tension is gradually increased as arcuate contact with the pins increases. The decrease in the angles between successive reaches of the strip from pin to pin, increases the pressure of the strips against the pins, while at the same time, the angular contact of the strips against the pins is increased.

Where the pins are supported from one end only, as shown in the drawing, the material may be readily threaded through the tension device.

I claim:

Apparatus for applying tension to a reach of moving material, said apparatus comprising a set of non-rotatable tension pins each supported by a rigid frame, a carriage movable along said frame and carrying a second set of tension pins in such relation as to permit their movement into intercalated relation with the first set of pins, said carriage being deeply slotted to clear the pins of the first set, feeding means comprising a plurality of spaced-apart screw and nut elements for moving said carriage positively forward and positively back to change the relation of the sets of pins to each other while maintaining rigidly their spacing at any position, and means for driving the feeding screw and nut elements together, said tension pins being supported at one end only so as to permit lateral insertion of the material therebetween without disturbing the adjustment of the tension pins.

WALTER B. FREEMAN.